United States Patent [19]

Lucchesi

[11] Patent Number: 5,357,752
[45] Date of Patent: Oct. 25, 1994

[54] CONTROL OF SECONDARY AIR TO AN ELECTRICALLY HEATED CATALYST USING FEEDBACK CONTROL

[75] Inventor: Robert P. Lucchesi, North Brunswick, N.J.

[73] Assignee: Exxon Research and Engineering Company, Florham Park, N.J.

[21] Appl. No.: 108,205

[22] Filed: Aug. 17, 1993

[51] Int. Cl.$^5$ ............................................. F01N 3/20
[52] U.S. Cl. ...................................... 60/274; 60/276; 60/284; 60/289; 60/300; 123/697
[58] Field of Search ................. 60/274, 284, 289, 276, 60/300; 123/697

[56] References Cited

U.S. PATENT DOCUMENTS

| | | | |
|---|---|---|---|
| 3,768,982 | 10/1973 | Kitzner | 60/300 |
| 5,146,743 | 9/1992 | Maus | 60/300 |
| 5,167,120 | 12/1992 | Junginger | 123/697 |

FOREIGN PATENT DOCUMENTS

92/14912  9/1992  World Int. Prop. O. ............ 60/300

OTHER PUBLICATIONS

"Data Analysis of Independently Run EHC Programs", Baccarini, I.N., et al., SAE Paper No. 920850, Feb. 1992.
"Evaluation of Different Resistively Heated Catalyst Technologies", Hellman, K. H., et al., SAE Paper No. 912382, Oct. 1991.
"A Feedback A/F Control System for Low Emission Vehicles", Anderson, M. J., SAE Paper No. 930388, Mar. 1993.
"Fuel Effects on Emissions from an Advanced Technology Vehicle" Weber, P. A. et al., SAE Paper No. 922245, Oct. 1992.
"Recent Developments in Electrically Heated Metal Monoliths" Whittenberger, W. A., et al., SAE Paper No. 900503, Feb. 1990.
"Experiences with Electrically Heated Catalysts" Hurley, R. G., et al., SAE paper No. 912384, Oct. 1991.
"New Potential Exhaust Gas Aftertreatment Technologies for 'Clean Car' Legislation" Gottberg, I., et al., SAE Paper No. 910840, Feb. 1991.
"Air Injection to an Electrically–Heated Catalyst for Reducing Cold–Start Benzene Emissions from Gasoline Vehicles", Heimrich–SAE Paper No. 902115 (Oct. 1990).
"Electrically–Heated Catalyst System Conversion on Two Current–Technology Vehicles" Heimrich, M. J., et al., SAE paper No. 910612–Feb. 1991.
"The Effect of Aromatics, MTBE, Olefins and T90 on Mass Exhaust Emissions from Current and Older Vehicles–The Auto/Oil Air Quality Improvement Research Program" Hochhauser, A. M., et al., SAE Paper No. 912322, Oct. 1991.
"Electrically Heated Extruded Metal Converters for Low Emission Vehicles" Socha, L. S., et al., SAE Paper No. 920093, Feb. 1992.

Primary Examiner—Douglas Hart
Attorney, Agent, or Firm—Joseph J. Allocca

[57] ABSTRACT

The injection of secondary air into the exhaust system of an internal combustion engine equipped with an electrically heated catalyst (EHC) upstream of a catalytic converter using a secondary pump is controlled by use of a dedicated heated oxygen sensor located downstream of the electrically heated catalyst in the exhaust stream from said EHC. The sensor measures the oxygen content in the EHC exhaust stream and sends a signal to a controller which turns on a secondary air pump when the signal from the heated sensor exceeds a pre-selected set point on the controller thereby injecting supplementary air into the exhaust stream from the internal combustion engine to the EHC.

7 Claims, 6 Drawing Sheets

CONTROL OF SECONDARY AIR TO AN ELECTRICALLY HEATED CATALYST USING FEEDBACK CONTROL

FIELD OF THE INVENTION

The present invention relates to the simultaneous control of the hydrocarbon, CO and $NO_x$ emissions from an internal combustion engine during cold start-up/warm-up and hot start-up using in front of the standard catalytic converter an electrically heated catalytic converter equipped with a secondary air injection pump.

BACKGROUND OF THE INVENTION

Internal combustion engine exhaust emissions comprising hydrocarbons, CO and $NO_x$ are controlled by use of catalytic converters. The majority of hydrocarbon and CO emissions from such engines occurs within a few minutes after starting a cold engine. During start-up and warm-up while the engine is running fuel rich to avoid running or driveability problems and before the catalytic converter is heated to a sufficient temperature (light-off temperature) to reduce hydrocarbon and CO emission, the catalytic converter is not operating at a sufficiently high level of efficiency to control the emissions. To control those start-up/warm-up or hot start emissions an electrically heated catalytic converter (EHC) is located between the internal combustion engine and the standard catalytic converter. The EHC provides an active catalytic surface to convert start-up/warm-up or hot start emissions. Providing this EHC with a secondary oxygen pump to inject supplementary oxygen (air) into the exhaust gas introduced into the EHC allows for more complete combustion of hydrocarbons and CO present in the exhaust. Such pump is normally run continuously for some arbitrary pre-set time commencing at start-up. This running time is typically only about a minute. If the time selected is too short, hydrocarbon and CO emissions are not adequately controlled. If the time set is too long such that excessive air is introduced after the standard catalytic converter has warmed up and engine operation has switched to closed-loop, $NO_x$ emissions increase. The period for which the secondary air pump should run to insure maximum hydrocarbon, CO, and $NO_x$ control depends on engine type, fuel composition, temperature and the particular exhaust system. Control of the secondary air pump by arbitrarily setting a running period is not an effective control mechanism.

THE PRESENT INVENTION

The present invention is directed to a system and a method for simultaneously controlling the hydrocarbon, CO, and $NO_x$ emissions of an internal combustion engine, either spark ignition or compression ignition (Diesel) preferably spark ignition, during engine start-up/warm-up or engine hot start. The system and method involves the use and control of supplementary air/oxygen injected into the exhaust stream fed into an electrically heated catalytic converter and the automatic feed back control of the supplementary air/oxygen injection stream by use of a heated oxygen sensor located downstream from said electrically heated catalytic converter.

The injection of secondary air into an exhaust system of an internal combustion engine comprising an engine, an exhaust manifold/pipe from the engine directing exhaust gas from the engine into an electrically heated catalytic converter, an exhaust pipe from said EHC leading into a catalytic converter which discharges the treated exhaust into the atmosphere, and a secondary air/oxygen pump for injecting secondary air into the engine manifold/pipe directing exhaust into the EHC for the purpose of controlling the hydrocarbon and CO emissions of the engine during start-up/warm-up and hot start-up is controlled so that CO, hydrocarbon and $NO_x$ emissions are simultaneously controlled with CO and hydrocarbon emissions being reduced while minimizing or preventing any increase in $NO_x$ emissions by use of a heated oxygen sensor inserted into the exhaust stream from the EHC, said sensor providing a signal voltage which varies in response to the oxygen content of the exhaust stream which signal voltage is sent to a controller preset to turn on the secondary air/oxygen pump when it receives a signal above a preset set-point from the heated oxygen sensor, which signal is generated in response to the oxygen content of the stream.

The heated oxygen sensor in the EHC exhaust stream is a separate sensor and is independent of and distinct in both identity and function from any oxygen sensor used in conjunction with the internal combustion engine to control the fuel intake of the engine.

The heated oxygen sensor in the EHC exhaust stream is heated at the same time the EHC is heated prior to engine start-up and measures the oxygen content or air/fuel ratio of that exhaust stream. Depending on the oxygen content, the heated sensor generates a variable voltage nominally between zero and 1, zero being the voltage when the stream is oxygen rich (i.e. fuel lean) and 1 when the stream is oxygen poor (i.e. fuel rich). This voltage signal is fed from the sensor to a controller which determines in response to the signal whether the supplementary air/oxygen pump should be turned on or off, depending on whether the voltage signal is above or below the pre-set value programmed into the controller (the set-point).

It has been discovered that hydrocarbon emissions, CO emissions and $NO_x$ emissions can be simultaneously controlled over the entire start-up/warm-up sequence and hot start sequence by running the supplementary air pump only when the controller receives a signal from the heated oxygen sensor of at least about 0.25 volts, preferably at least about 0.28 volts, more preferably at least about 0.29 volts, most preferably at least about 0.30 volts.

It was believed that since the heated oxygen sensor output varies from zero volt (fuel lean) to 1 volt (fuel rich), the secondary air injection controller set point should be 0.5 volt, so that the system would run at a stoichiometric air/fuel ratio to achieve CO and hydrocarbon conversion without a debit of $NO_x$ conversion. It was unexpectedly discovered that the 0.5 volt set point was insufficient to allow the electrically heated catalytic converter to convert a significant amount of CO and hydrocarbon. It was thus unexpected that the effective set point was at least about 0.25, most preferably at least about 0.3 volt.

Thus, if the engine is running fuel rich (as at cold engine start-up) the sensor would generate a voltage corresponding to oxygen lean operation, i.e., a voltage above the set point and the controller would turn on the supplementary air/oxygen pump. Because the pump is running only in response to commands sent from the controller, when the voltage signal to the controller from the sensor falls below the set-point (i.e. fuel lean or oxygen rich engine operation) the controller turns off the pump, thus preventing excess air/oxygen from being injected into the exhaust stream and thus insuring that the injection of excess air does not contribute to any increase in $NO_x$ emissions.

Once the engine has completed the start-up/warm-up period of operation (typically 2–3 minutes) the supplementary air/oxygen sensor may generate a voltage below the set-point for an extended period of time. While it is possible that the supplementary heated sensor/controller/pump combination can be manually switched off by the engine operator, it is also possible to program the controller to deactivate itself after either a predetermined period of time after engine start-up or deactivate after receiving a signal from the sensor which is below the set point for a predetermined period of time. Once the engine goes into closed-loop operation the supplementary oxygen sensor will not necessarily continuously generate a signal below the set-point for an extended period of time. Consequently, deactivation after a predetermined time is the currently preferred mode of operation. In the automatic mode of operation the controller can be programmed to reset after the engine is turned off so that the secondary sensor/controller/pump combination will be available for emissions control any time the engine is started, regardless of whether it is a cold start or any degree of hot start.

Figure 1:
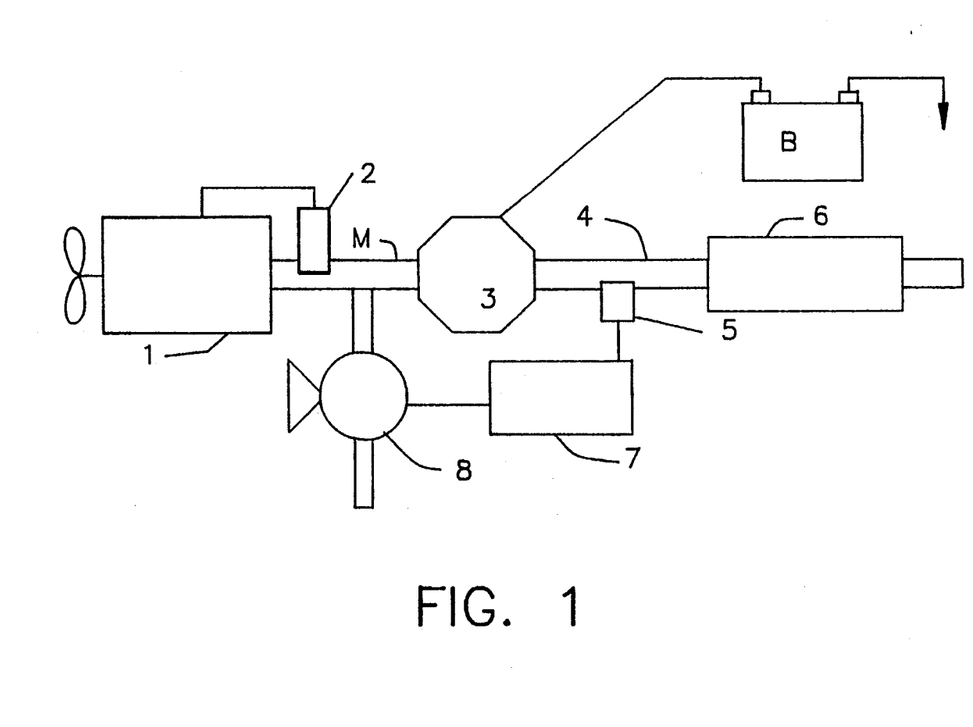
FIG. 1 is a schematic of the exhaust system of an internal combustion engine equipped with an electrically heated catalyst, secondary air injection pump, heated oxygen sensor and controller providing feed back control to the pump.

FIG. 1 presents a schematic of the arrangement of an internal combustion engine exhaust system equipped with an electrically heated catalytic converter provided with a sensor controlled secondary air pump.

Exhaust gas from the engine (1) passes to the electrically heated catalytic converter (EHC) (3) through exhaust manifold/pipe (M). Oxygen sensor (2) is used to adjust fuel intake of the engine. Electrically heated catalytic converter (3) is headed by a battery (B). Exhaust from the electrically heated catalytic converter is sent via pipe (4) to the main catalytic converter (6). The oxygen content of the exhaust gas in pipe (4) is measured by heated secondary oxygen sensor (5) which is heated by a battery (B) at the same time the EHC (3) is being heated. Heated secondary oxygen sensor (5) sends a variable signal ranging nominally between zero and 1 volt, depending on the oxygen content of the exhaust gas, to controller (7). The controller is set such that when the voltage signal from the sensor (5) is at or above a set point (previously described) the secondary air pump (8) is turned on and when the voltage drops below the previously recited set-point it turns off the pump.

EXAMPLES

Two vehicles were equipped with EHCs with heated secondary oxygen sensor/controller/pump combination hereinafter identified as secondary air injection feedback control (SAIC): a 1991 Ford Tempo (4 cylinder 2.3 L) and a 1992 Chevrolet Lumina (6 cylinder 3.1 L). The Lumina was equipped with a California PROM (Programmable Read Only Memory) which allowed attainment of the current California $NO_x$ emissions level (0.4 g/mile). EHCs were added upstream of the main catalyst on both vehicles. In both vehicles the main catalyst is located in the underbody location. A section of the exhaust pipe just upstream of the main catalyst was removed and flanges were welded onto each of the exposed ends. The section which was cut out was also equipped with a flange on both ends so that it could be fit back into the exhaust system. This allowed the vehicle to be quickly transformed back to the base condition. The EHC (Camet model 10-8) was incorporated into an exhaust pipe spool piece which contained a port for secondary air injection upstream of the EHC, a port for an oxygen sensor just downstream of the EHC, and a flange on both ends. Secondary air was provided to the EHC via an electric air pump (Coltec Automotive X030174D, 60 standard liters per minute capacity). A normally closed solenoid valve was placed between the air pump and the exhaust pipe. This valve was energized whenever power was sent to the electric air pump. In addition to protecting the pump from the exhaust gas, the solenoid valve prevented air from being aspirated into the exhaust system when the pump was not being operated. The Ford Tempo was the first vehicle equipped and was tested for emissions levels for three cases: base vehicle, with EHC but no air injection control, and with EHC using SAIC. All emissions results cited below are for the US Federal Test Procedure (FTP) for measuring automotive exhaust emissions. In the FTP a vehicle is driven on a chassis dynamometer which simulates road driving conditions. The emissions from the vehicle are collected in a special plastic "bag" and, after the test, the emissions in the bag are analyzed to determine the total amount of CO, hydrocarbons and $NO_x$ emitted. The FTP consists of three phases: the cold start phase, the hot stabilized phase and the hot start phase. The emissions from each phase are collected in separate bags, thus Bag 1, Bag 2 and Bag 3 represent the three phases of the FTP. The first two phases of the FTP constitute what is known as the LA-4 cycle which is meant to represent the way vehicles are actually driven. The LA-4 cycle was developed by examining driving patterns in Los Angeles. In the LA-4 cycle the first 505 seconds is phase or Bag 1 and the last 869 seconds is phase or Bag 2. Bag 3 of the FTP is a repeat of the first 505 seconds of the LA-4 cycle except that the car is started hot after soaking for 10 minutes after completing Bags 1 and 2 of the FTP. Evaporative emissions from the test vehicles were not measured. Vehicles were conditioned by driving an LA-4 cycle the day prior to the emissions test using the test fuel. In cases where either fuel or condition (with or without EHC) were changed, the vehicle was conditioned using the procedure adopted by the Auto/Oil Air Quality Improvement Research Program (AQIRP) for changing fuels (an LA-4, 5 min. soak, 1 min idle, 1 min soak, 1 min idle, 1 min soak followed by another LA-4. Soak means the engine is turned off and allowed to sit for an amount of time before restart). This allowed the adaptive learning systems of current technology vehicles to adjust to the new conditions. The emissions analytical benches were checked for calibration using zero and span gases prior to each test.

The following procedure was adopted for testing a vehicle equipped with an EHC. Prior to beginning the FTP, the EHC was heated resistively to about 400° C. (750° F.) using the vehicle battery. The heat-up time was typically 10–15 seconds. At the time the EHC heat- Tables 1 and 2 show a summary of emissions data for the Tempo and Lumina, respectively, for various conditions and fuels and indicate how many FTP runs were made for each set of conditions.

Three different fuels were employed in these tests. They were Indolene (referred to as the certification fuel in Auto/Oil), RF-F and RF-I, RF-F is a fuel having a low T90 level (280°–300° F.) and low aromatics level (20 vol %). RF-I is a second fuel and it had a high T90 level (350°–360° F.) and a high aromatics level (45 vol %). Neither RF-F nor RF-I contained any MTBE and both had low olefins level (5 vol %). Fuel sulfur for both was about the same; RF-I had 261 ppms and RF-F had 290 ppms.

TABLE 1

FTP exhaust emissions data for 1991 Ford Tempo

| FUEL | CONDITION | # RUNS | FTP Exhaust Emissions (grams/mile) | | |
|---|---|---|---|---|---|
| | | | CO | THC | NOx |
| Indolene | Base Vehicle | 5 | 1.081 ± 14%(1) | 0.130 ± 13% | 0.172 ± 7% |
| Indolene | EHC w/o SAIC | 1 | .595 | 0.063 | 0.253 |
| Indolene | EHC w/SAIC(0.3V) | 3 | 0.869 ± 7% | 0.083 ± 10% | 0.173 ± 9% |
| Indolene | EHC w/SAIC(0.1V) | 1 | .789 | .084 | .252 |
| Indolene | EHC w/SAIC(0.2V) | 1 | .596 | .064 | .233 |
| Indolene | EHC w/SAIC(0.25V) | 3 | .815 ± 15% | .087 ± 13% | .181 ± 7% |
| Indolene | EHC w/SAIC(0.5V) | 1 | 1.469 | .119 | .202 |
| RF-F | Base Vehicle | 3 | 1.286 ± 1% | 0.135 ± 4% | 0.267 ± 5% |
| RF-F | EHC w/SAIC | 5 | 0.856 ± 15% | 0.078 ± 13% | 0.224 ± 5% |
| RF-I | Base Vehicle | 3 | 0.925 ± 16% | 0.193 ± 22% | 0.250 ± 5% |
| RF-I | EHC w/SAIC | 4 | 0.563 ± 5% | 0.083 ± 9% | 0.201 ± 6% |

TABLE 2

FTP exhaust emissions data for 1992 Chevrolet Lumina

| FUEL | CONDITION | # RUNS | FTP Exhaust Emissions (grams/mile) | | | |
|---|---|---|---|---|---|---|
| | | | CO | THC | NMHC* | NOx |
| Indolene | Base Vehicle | 5 | 0.943 ± 15% | 0.155 ± 7% | — | 0.234 ± 11% |
| Indolene | EHC w/SAIC | 6 | 0.833 ± 22% | 0.072 ± 14% | — | 0.178 ± 4% |
| RF-F | Base Vehicle | 3 | 1.297 ± 8% | 0.180 ± 7% | .153 ± 7% | 0.404 ± 6% |
| RF-F | EHC w/SAIC | 5 | 0.868 ± 9% | 0.069 ± 7% | 0.047 ± 10% | 0.315 ± 7% |
| RF-I | Base Vehicle | 3 | 1.327 ± 7% | 0.231 ± 4% | 0.212 ± 4% | 0.269 ± 6% |
| RF-I | EHC w/SAIC | 6 | 1.136 ± 3% | 0.087 ± 5% | 0.067 ± 7% | 0.203 ± 7% |

(1) ±X% refers to one standard deviation
*non-methane hydrocarbons up began, power was also delivered to the heated O2 sensor used in the secondary air injection feedback control loop. Once EHC heat-up was completed, the secondary air pump was started at the same time as the vehicle. For the EHC without air injection control case, the air pump was manually turned on at vehicle start-up (Bags 1 cold start and 3 hot start) and turned off manually after about 125 seconds. The air pump was run continuously for the first 15 seconds after start-up until the vehicle was shifted into drive to begin the first acceleration. At this time the air pump power supply was manually switched into control mode which allowed the controller to switch the air pump on and off depending on the signal from the heated O2 sensor. The air pump was manually disabled 125 seconds into the test (bottom of the first hill of Bag 1). This procedure was repeated at the beginning of Bag 3 (the hot start). In setting up the test for the 1991 Ford 2.3 L engine, a number of different controller set points were used, 0.1 V, 0.2 V, 0.25 V, 0.3 V, and 0.5 V. It was found that 0.3 V unexpectedly yielded the most desirable combination of CO and hydrocarbon emission reduction with the smallest $NO_x$ debit. Thereafter the controller set point was 0.3 V. This procedure was used for both test vehicles. It allowed for significant decreases in CO and especially total hydrocarbon (THC) emissions in both vehicles without causing $NO_x$ emissions to increase.

Figure 2:
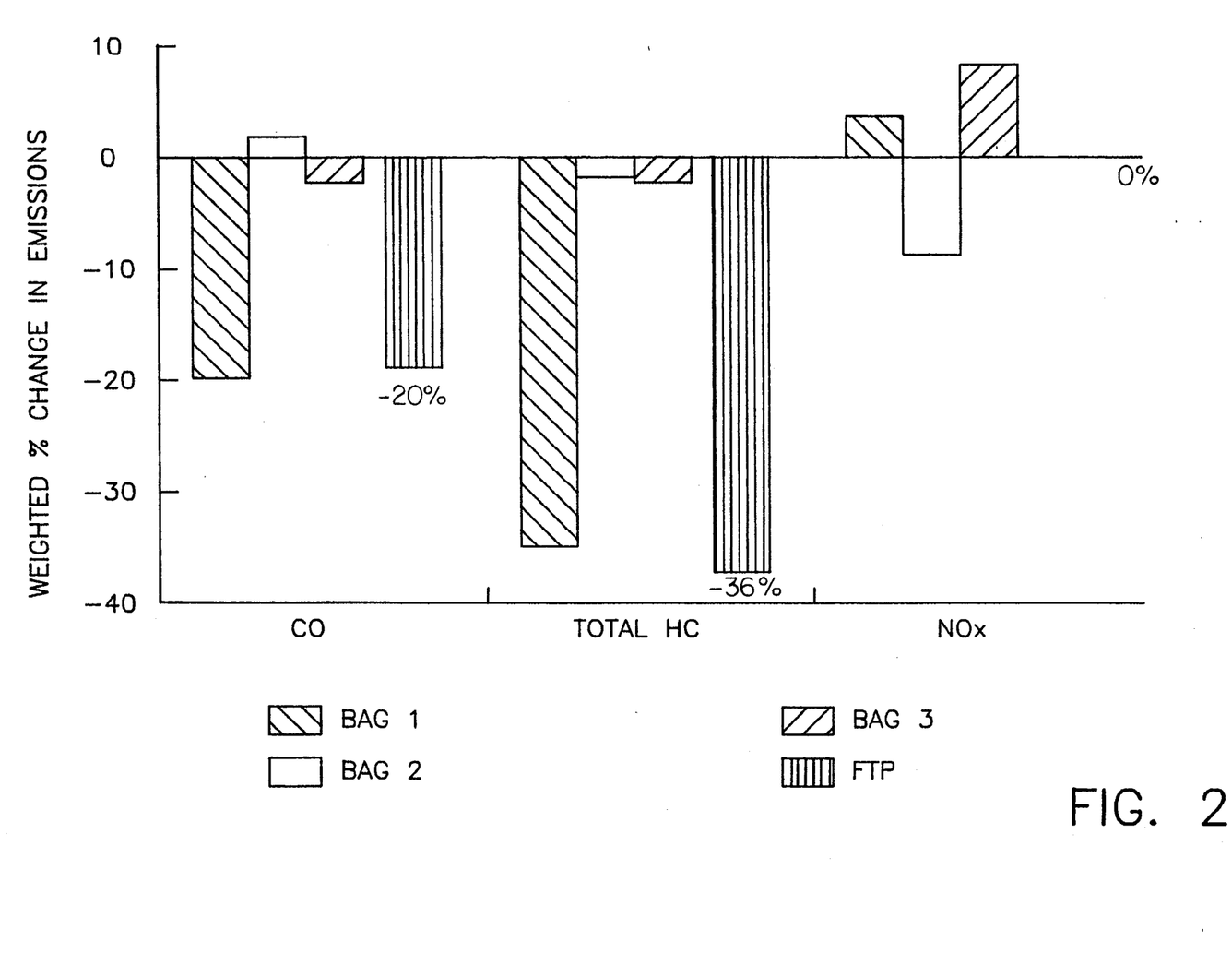
FIG. 2 shows the effect of adding an electrically heated catalyst with secondary air injection feed back control to a Ford Tempo 4 cylinder 2.3 L engine running on Indolene as fuel.
Figure 3:
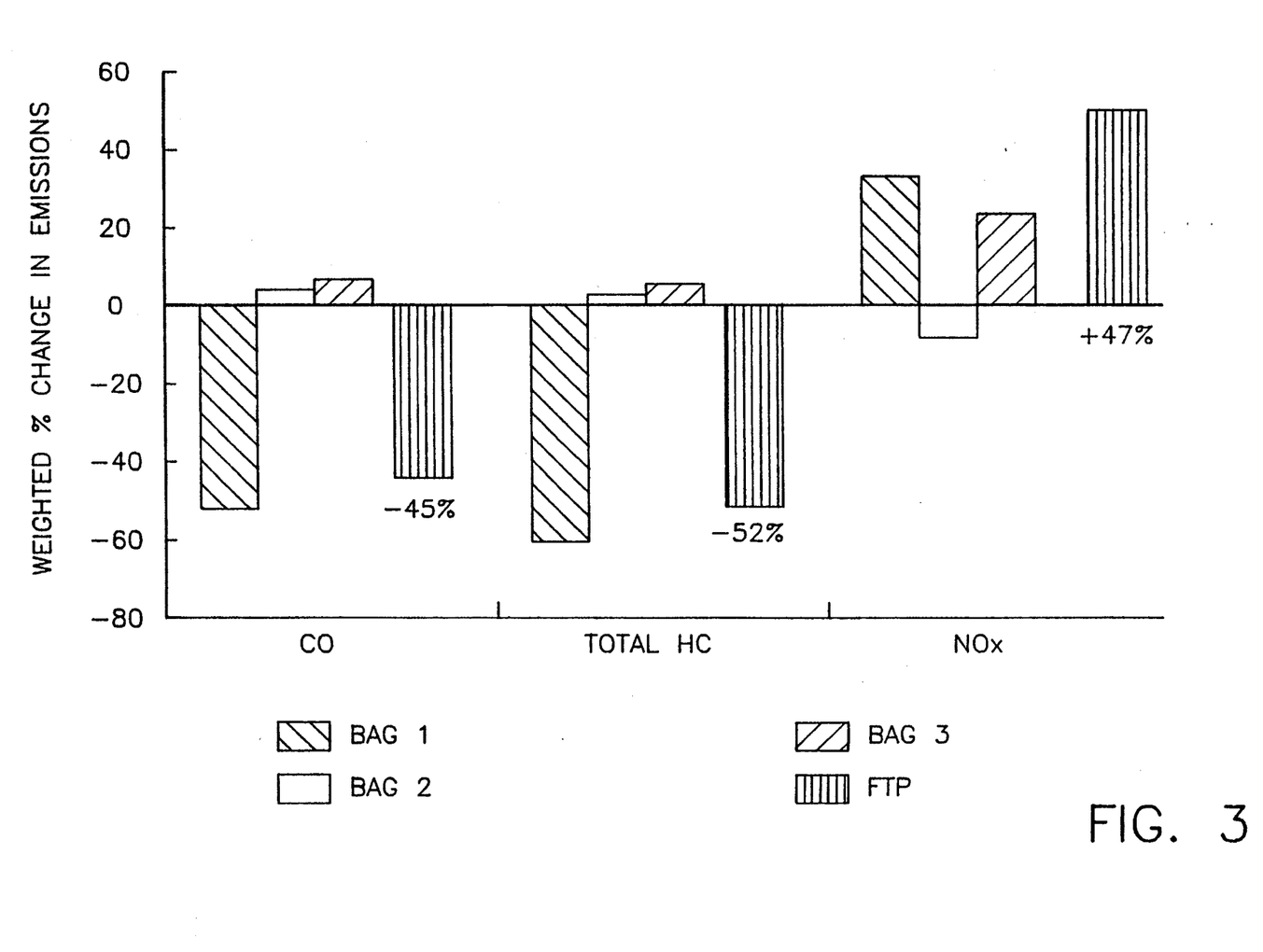
FIG. 3 shows the effect of adding an electrically heated catalyst without secondary air injection feed back control (just continuous air injection for 125 sec.) to a Ford Tempo 4 cylinder 2.3 L engine running on Indolene as fuel.

FIGS. 2 and 3 show the effect on the Ford Tempo's emissions when an EHC with and without air injection feedback control was applied to the base vehicle, respectively. The changes reported are with respect to a base line established using only the original equipment manufacturer supplied catalytic converter, no EHC or air injection being used at all. The solid bars represent the percentage change in emissions for the entire FTP. The remaining three bars represent the relative contributions to the change in composite emissions made by each individual bag of the FTP. The vector sum of these three bars equals the change in composite FTP emissions for a particular pollutant. This type of graph has great value in understanding which portion of the FTP has the most effect on the overall emissions.

FIG. 2 shows the change in emissions on the Ford Tempo when equipped with an EHC with SAIC. There was a 20% decrease in CO emissions, due primarily to a decrease in Bag 1 (the cold-start portion of the FTP). Total HC decreased by 36%, due once again to a decrease in Bag 1. $NO_x$ had no net change for the composite FTP, but there was a significant decrease of about 10% in Bag 2. This is probably due to the increased catalyst surface area provided by the EHC. Slight increases in Bags 1 and 3 due to a slight excess of secondary air injection resulted in no overall $NO_x$ debit due to the EHC. This data suggests that because there is no reduction of CO and HC in Bag 3 due to the EHC, secondary air injection could have been eliminated for this particular vehicle.

FIG. 3 however shows the change in emissions on the Ford Tempo when equipped with an EHC without air injection control. While CO decreased by 45% which is about twice the decrease observed for the EHC with SAIC, and total HC decreased 52% which is about a 44% more than the decrease observed for the EHC with SAIC, $NO_x$ emissions, increased by 47%, due to large increases in Bags 1 and 3. This increase is obviously due to an excess of air injection following vehicle start-up.

Figure 4:
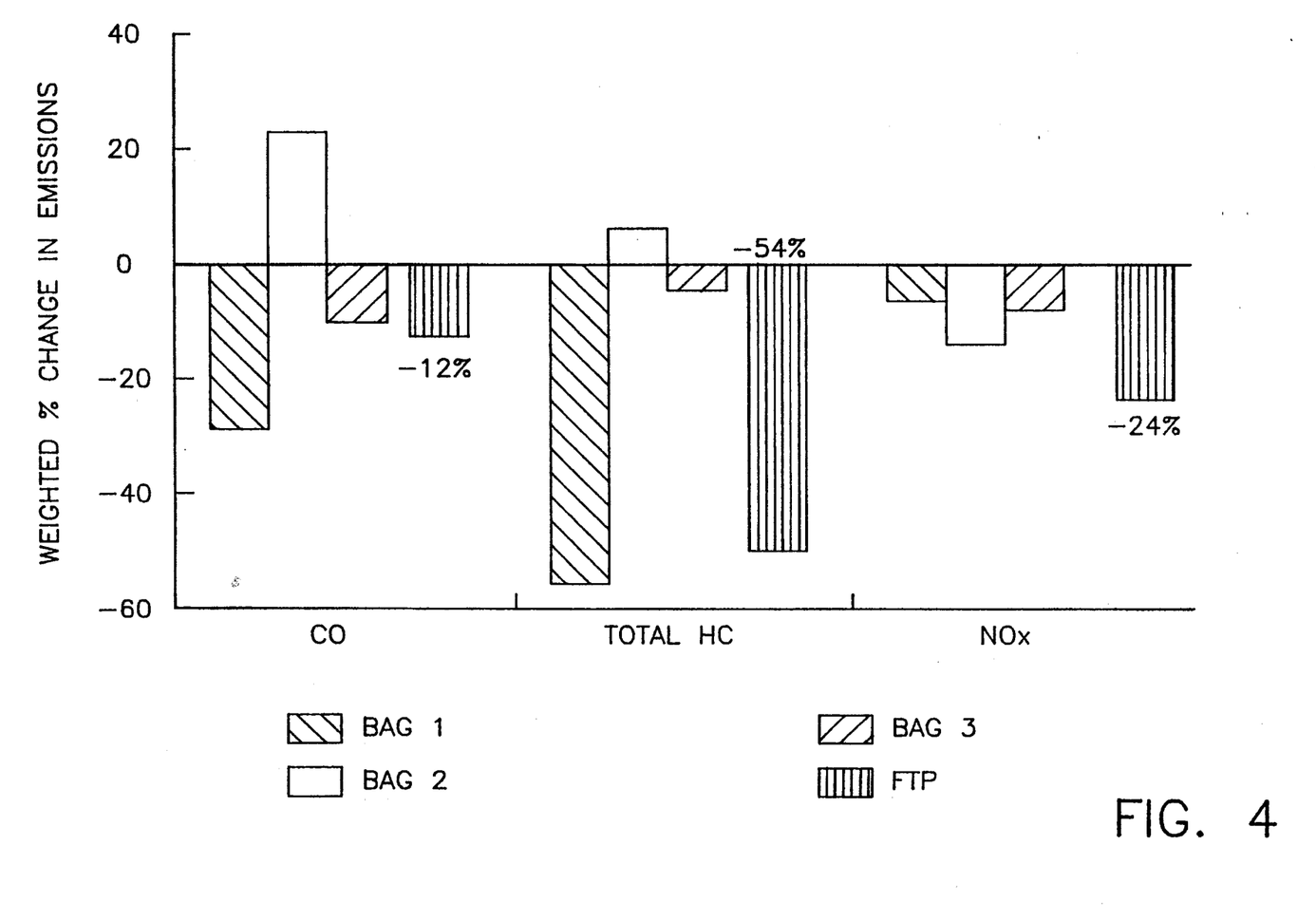
FIGS. 4, 5 and 6 show the effect of running a Chevrolet Lumina with 6 cylinder 3.1 L engine with electrically heat catalyst and secondary air injection feed back control using Indolene, RF-I and RF-F as fuel respectively.
Figure 5:
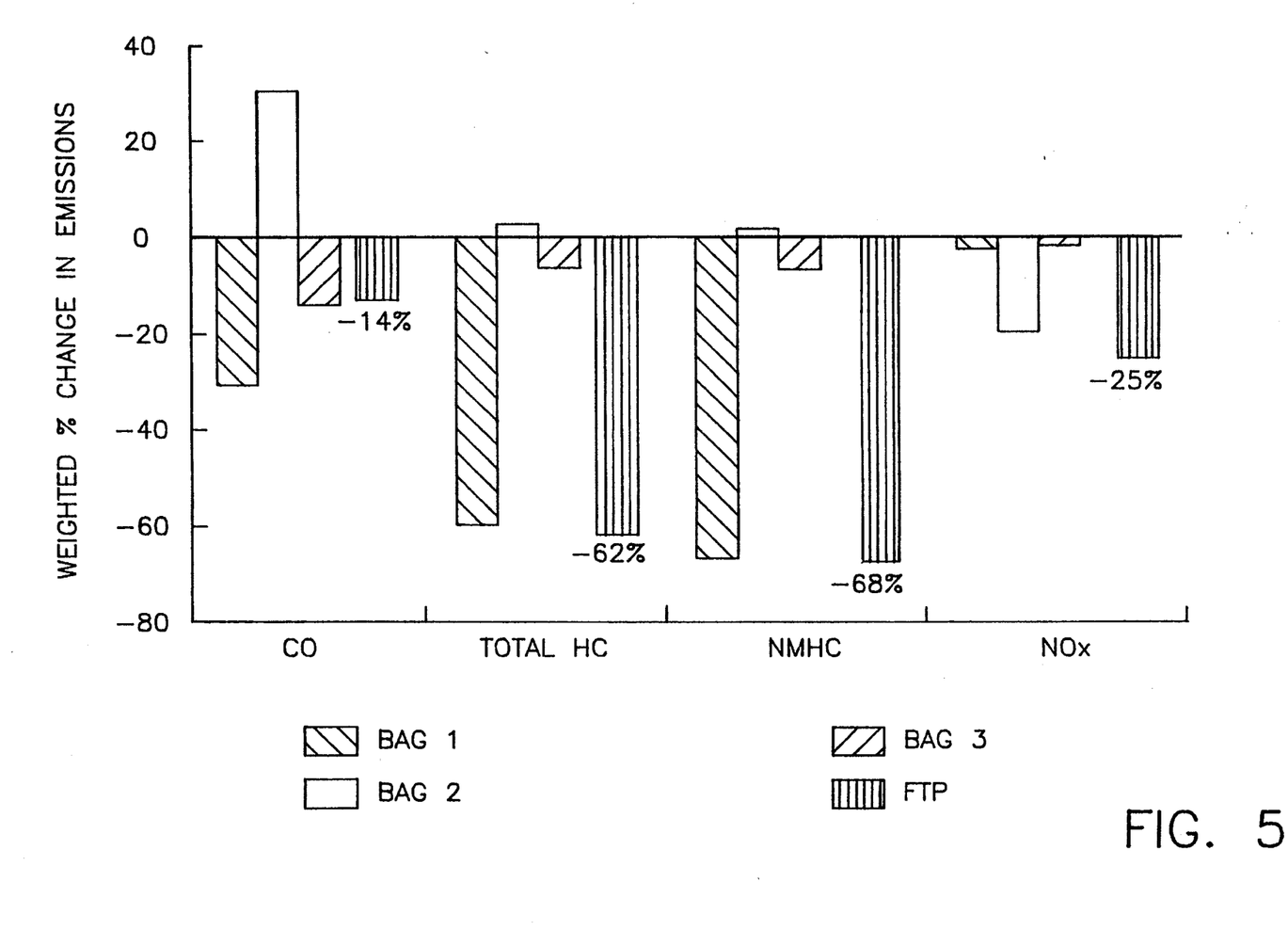
Figure 6:
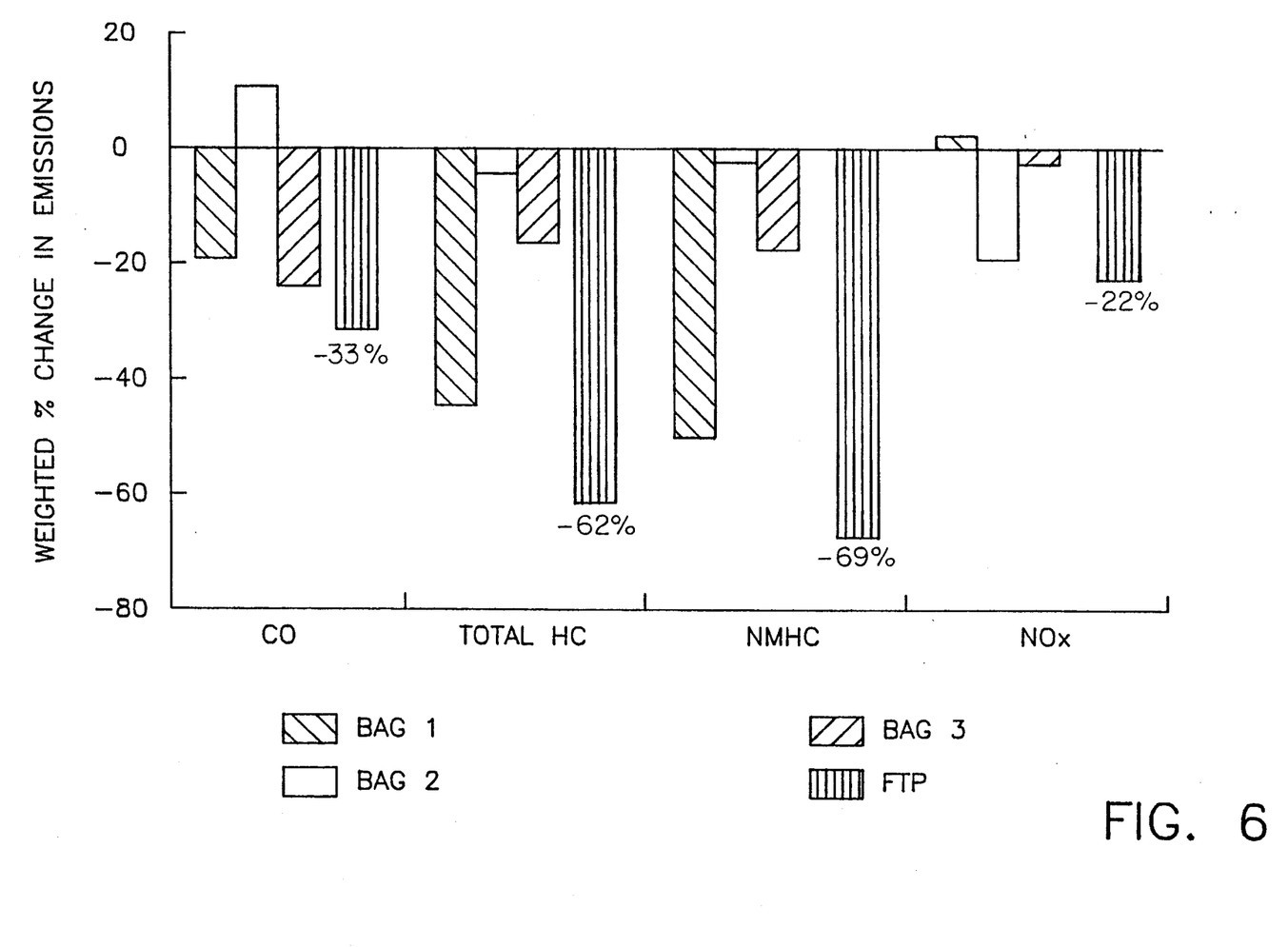

This data show clearly that the sensor controlled secondary air injection allows an EHC to reduce start-up HC and CO emissions, while not causing a $NO_x$ debit. The SAIC achieved similar results on the Chevrolet Lumina using the same set point, which data are presented graphically, see FIGS. 4, 5 and 6. The figures show the weighed % change in emissions when an EHC with SAIC is used as compared to a base case in which no EHC and air injection at all is used for cases in which the fuels used were indolene, RF-I and RF-F respectively. In all cases an overall reduction in CO and hydrocarbon was achieved using EHC with controlled air injections compared with the base case, without a debit to $NO_x$ emissions. (Any decrease in $NO_x$ emissions is attributed to a shift in the air/fuel ratio caused by the addition of the EHC.) Thus, the SAIC adapted to a completely different vehicle without the need to re-calibrate the air injection schedule or set-point.

What is claimed is:

1. An internal combustion engine hydrocarbon, CO, and $NO_x$ emissions control system comprising:
   (a) an internal combustion engine;
   (b) an engine exhaust manifold/pipe attached to and in gaseous communication with said internal combustion engine for directing exhaust gases produced by said engine away from said engine;
   (c) an electrically heated catalytic converter for controlling engine hydrocarbon and CO emissions during engine start-up/warm-up or engine hot start cycle in gaseous communication with said internal combustion engine by means of the exhaust manifold/pipe which introduces engine exhaust gases into said electrically heated catalytic converter;
   (d) a pipe extending from said electrically heated catalytic converter for directing exhaust gases treated in said electrically heated catalytic converter away from said converter;
   (e) a heated oxygen sensor in gaseous communication with the exhaust gases in the pipe extending from said electrically heated catalytic converter, said heated oxygen sensor measuring the oxygen or air/fuel ratio in the exhaust gases exiting the electrically heated catalytic converter and producing a signal voltage of between zero and one volt in response to said oxygen content or air/fuel ratio;
   (f) a controller means in electrical communication with the heated oxygen sensor;
   (g) a supplementary air pump in electrical communication with and under the control of the controller means and in gaseous communication with the engine exhaust manifold/pipe wherein said controller means is adjusted to turn on the supplementary air pump when the signal voltage received by said controller means from said heated oxygen sensor is at least about 0.25 volt;
   (h) a catalytic converter attached to the pipe extending from the electrically heated catalytic converter for catalytically treating the exhaust gases from the electrically heated catalytic converter.

2. The emissions control system of claim 1 wherein the controller means is adjusted to turn on the supplementary air/oxygen pump when the signal voltage received from the heated oxygen sensor is at least about 0.28 volt.

3. The emissions control system of claim 1 wherein the controller means is adjusted to turn on the supplementary air/oxygen pump when the signal voltage received from the heated oxygen sensor is at least about 0.3 volt.

4. The emissions control system of claim 1 wherein the controller means is deactivated after completion of the engine start-up/warm-up or engine hot start cycle.

5. A method for simultaneously controlling the hydrocarbon, CO and $NO_x$ emissions produced by an internal combustion engine during engine start-up/warm-up or engine hot start, said method comprising, in an exhaust system including an internal combustion engine which generates an exhaust gas stream which stream is accumulated and directed away from the engine by an exhaust manifold/pipe which exhaust manifold/pipe directs the exhaust gas stream to an electrically heated catalytic converter for the treatment of hydrocarbons and CO in the engine exhaust stream generated during engine start-up/warm-up or engine hot start, the exhaust stream from said electrically heated catalytic converter being discharged from said heated converter through a pipe which directs the exhaust gas into a catalytic converter wherein final treatment of exhaust hydrocarbons, CO and $NO_x$ is performed, said treated exhaust gas being discharged from the catalytic converter to the atmosphere, inserting into the pipe between the electrically heated catalytic converter and the catalytic converter a heated oxygen sensor which measures the oxygen or air/fuel ratio of the exhaust gas exiting the electrically heated catalytic converter and produces a signal voltage in response to said oxygen content or air/fuel ratio, said heated oxygen sensor being in electrical communication with a controller means which reads the signal voltage generated by the heated oxygen sensor and is itself in electrical communication with a supplementary air/oxygen pump which is attached to an in gaseous communication with the engine exhaust manifold/pipe ahead of the electrically heated catalytic converter, said controller being adjusted to turn on the supplementary air/oxygen pump when the signal voltage generated by the heated oxygen sensor is at least about 0.25 volt.

6. The method of claim 5 wherein the controller is adjusted to turn on the supplementary air/oxygen pump when the signal voltage received from the heated oxygen sensor is at least about 0.28 volt.

7. The method of claim 5 wherein the controller is adjusted to turn on the supplementary air/oxygen pump when the signal voltage received from the heated oxygen sensor is at least about 0.3 volt.

* * * * *